(12) United States Patent
Geiger et al.

(10) Patent No.: US 9,874,371 B2
(45) Date of Patent: Jan. 23, 2018

(54) SLOTTED BEARING WITH LABYRINTH SEAL RINGS FOR DAMPER ACTUATORS

(71) Applicant: SIEMENS AKTIENGESELLSCHAFT, Munich (DE)

(72) Inventors: Fabian Geiger, Goldau (CH); Christian Grossenbacher, Waltenschwil (CH)

(73) Assignee: Siemens Aktiengesellschaft, Munich (DE)

( * ) Notice: Subject to any disclaimer, the term of this patent is extended or adjusted under 35 U.S.C. 154(b) by 534 days.

(21) Appl. No.: 14/354,646

(22) PCT Filed: Oct. 23, 2012

(86) PCT No.: PCT/EP2012/070933
§ 371 (c)(1),
(2) Date: Apr. 28, 2014

(87) PCT Pub. No.: WO2013/060664
PCT Pub. Date: May 2, 2013

(65) Prior Publication Data
US 2014/0331803 A1   Nov. 13, 2014

(30) Foreign Application Priority Data
Oct. 28, 2011   (EP) ..................................... 11187184

(51) Int. Cl.
F24F 13/10   (2006.01)
F24F 13/14   (2006.01)
(Continued)

(52) U.S. Cl.
CPC .............. *F24F 13/10* (2013.01); *F16C 17/02* (2013.01); *F16C 33/046* (2013.01); *F16C 33/74* (2013.01);
(Continued)

(58) Field of Classification Search
CPC ....... F24F 13/10; F24F 13/1486; F16C 17/02; F16C 17/22
See application file for complete search history.

(56) References Cited

U.S. PATENT DOCUMENTS 3,043,636 A * 7/1962 MacInnes ............. F01D 25/166
384/287
4,102,419 A * 7/1978 Klima ..................... E21B 10/22
175/371
(Continued)

FOREIGN PATENT DOCUMENTS

CN   101105201 A   1/2008
DE   8010220 U1    5/1981
(Continued)

*Primary Examiner* — Nathaniel Herzfeld
(74) *Attorney, Agent, or Firm* — Laurence Greenberg; Werner Stemer; Ralph Locher (57) ABSTRACT

A drive for adjusting the damper of a building air vent has a main body formed with a receiving aperture. A bearing ring is arranged in the receiving aperture and secured to the main body. The bearing ring has a circumferential direction, wherein the bearing ring has a first end and a second end in circumferential direction. The first end and the second end can be spaced apart in the circumferential direction such that there is a gap between the first end and the second end. A hub for actuating the drive shaft of the damper is fixed to the bearing ring such that the hub is rotatably mounted on the main body relative to the bearing ring.

12 Claims, 6 Drawing Sheets

(51) Int. Cl.
*F16C 17/02* (2006.01)
*F16C 33/74* (2006.01)
*F16C 35/02* (2006.01)
*F16C 33/04* (2006.01)

(52) U.S. Cl.
CPC .......... *F16C 35/02* (2013.01); *F24F 13/1486* (2013.01); *Y10T 74/1987* (2015.01)

(56) References Cited

U.S. PATENT DOCUMENTS

| | | | | |
|---|---|---|---|---|
| 4,177,716 | A | * | 12/1979 | Bowe ...................... A62C 2/247 118/326 |
| 4,311,348 | A | * | 1/1982 | Olschewski ........ F16C 29/0602 29/898.03 |
| 4,415,166 | A | * | 11/1983 | Beia ........................ B62D 1/16 277/551 |
| 4,909,638 | A | | 3/1990 | Muto |
| 5,647,399 | A | * | 7/1997 | Andersen ........... B60H 1/00842 137/637.3 |
| 2002/0084272 | A1 | * | 7/2002 | Grossenbacher ...... H05K 5/063 220/4.21 |
| 2004/0175063 | A1 | * | 9/2004 | Puckett ................... F16C 17/22 384/278 |
| 2005/0287947 | A1 | * | 12/2005 | Ulicny ................ F24F 13/1426 454/358 |
| 2009/0034893 | A1 | * | 2/2009 | Back ....................... F16C 17/02 384/476 |
| 2009/0264063 | A1 | * | 10/2009 | Tinsley ................ A61K 31/352 454/324 |

FOREIGN PATENT DOCUMENTS

| | | |
|---|---|---|
| DE | 19530003 A1 | 2/1997 |
| DE | 10110383 A1 | 9/2002 |
| DE | 102004063660 A1 | 7/2006 |
| GB | 2304396 A | 3/1997 |
| GB | 2466516 A | 6/2010 |

\* cited by examiner

SLOTTED BEARING WITH LABYRINTH SEAL RINGS FOR DAMPER ACTUATORS

TECHNICAL FIELD

The present invention relates to a drive for adjusting a damper of a building as well as a method for adjusting a damper of a building.

BACKGROUND OF THE INVENTION

In modern buildings controllable dampers are used to achieve better regulation of the building climate. Non-central ventilation systems in particular are used more frequently as are individually regulatable ventilation units for single rooms, which require a more sophisticated regulation strategy in order to open and close individually arranged dampers in a specific manner. This results in an increasing demand for damper systems and drives for adjusting damper systems.

The drives for dampers are frequently arranged in small and relatively inaccessible installation spaces on buildings, for example in suspended ceilings or false floors. The requirements for the function and durability of damper drives are therefore stringent.

PRESENTATION OF THE INVENTION

One object of the invention is to provide a robust and precisely controllable damper drive for adjusting dampers. The object is achieved by a drive for adjusting a damper of a building and by a method for adjusting a damper of a building according to the independent claims.

According to a first aspect of the present invention a drive for adjusting a damper of a building is described. The drive has a main body with a receiving aperture, a bearing ring and a hub. The bearing ring is arranged in the receiving aperture and fastened to the main body. The bearing ring has a circumferential direction, the bearing ring having a first end and a second end in the circumferential direction, it being possible for the first end and the second end to be spaced apart in the circumferential direction, so that there is a gap between the first end and the second end. The hub serves to drive an output shaft of the damper. The hub is fastened to the bearing ring in such a manner that the hub is supported on the main body in a rotatable manner relative to the bearing ring.

According to a further aspect of the present invention a method for adjusting a damper of a building is described. According to the method a damper is adjusted by means of the drive described above. According to a further aspect of the present invention an adjustment mechanism for dampers of a building is described. The adjustment mechanism has the drive described above and at least one damper. The damper has an output shaft, which is fastened in the hub of the drive in a rotationally fixed manner. The hub can be rotated for example by means of an electric motor of the drive, so that the output shaft of the damper is rotated as a result and the damper is thus adjusted.

The main body of the drive has housing for example and a mounting plate, on which the individual elements of the drive, for example the bearing ring, can be mounted. The main body consists for example of a metal, in particular a light metal, for example aluminum, or a plastic material. Plastic bearing rings for example are used in combination with a metal hub and a metal housing.

The hub for driving an output shaft of the damper can be made from a plastic material or a metal. In particular the hub can consist of a zinc material and can be a die-cast zinc hub.

The hub can also have a further drive region, which forms a drive wheel for example. This drive wheel has a tooth profile on an outer surface, with a drive element for example of an electric motor of the drive engaging therein. The electric motor can be controlled in a specific manner by a control unit, in order to achieve a desired turning of the drive element and therefore of the drive wheel. The drive wheel of the hub rotates by a specified amount, so that the output shaft of the damper is also adjusted in a specific manner by way of the hub and a desired position change and adjustment of the damper is controlled.

The bearing ring according to the present invention is configured in particular as a slotted bearing ring, with which a distance or gap or slot results in the circumferential direction between the first end and the second end. The bearing ring is fastened to the main body by means of fastening means, for example screws, bonded connections or a fastening method described below consisting of a pin that engages in a fastening aperture. The hub is fastened to an upper surface of the bearing ring, for example to its radially inward facing upper surface and/or to an axial surface of the bearing ring, so that the hub is supported in a rotatable manner relative to the bearing ring.

In other words a friction-type bearing is provided between the axial and radial contact surfaces of the hub and the bearing ring. The hub can also be connected to the bearing ring in a fixed (i.e. rotationally fixed) manner and a friction-type bearing or relative rotatability can be provided between the main body and the bearing ring.

The gap between the first end and the second end of the bearing ring means that the bearing ring is flexible so that the first end and the second end can move away from and toward one another, so that for example the diameter of the bearing ring in particular can be changed by elastic deformation of the bearing ring. This allows compensation for temperature changes for example and the associated thermal expansion. In other words fewer thermal tensions result, in particular between the bearing ring, the main body and the hub. It is also possible to compensate for imprecise angular positioning between hub and output shaft or shaft of the damper. The gap allows the predetermination of larger manufacturing tolerances of the predetermined diameter of the bearing ring so that a simpler and more efficient method can be used to produce the bearing rings. The flexible and adjustable bearing ring also results in a reduction of the bearing play between the main body and the hub, so that the output shaft can be supported with greater precision in relation to the drive. The bearing body consists for example of a die-cast aluminum housing, the bearing ring, consisting for example of plastic, and the hub, consisting for example of a die-cast zinc material or plastic. The reduction of the bearing play is made possible for example by a flexible longitudinal compensation (by means of the gap) of the bearing ring at different temperatures.

The receiving aperture of the main body, the hub and the bearing ring in particular have a common center point. The rotation axes of the hub and output shaft run through the center point. The direction running along a common plane, the normal of which is parallel to the rotation axis, through the center point is referred to in the following as the radial direction. The direction extending on the lateral surface of the hub or bearing ring perpendicular to the radial direction and perpendicular to the axial direction is referred to in the following as the circumferential direction.

According to a further exemplary embodiment the first end has a first surface or a first plane, in which the first surface lies, with a first surface normal and the second end has a second surface or second plane, in which the second surface lies, opposite the first surface, with a second surface normal. The first surface and the second surface thus form two opposing surfaces in the circumferential direction, with the gap being formed between said first and second surfaces.

In a further exemplary embodiment of the present invention the first surface normal and the second surface normal run antiparallel to one another. The first surface normal has a first component and the second surface normal has a second component, with at least the first component and the second component running antiparallel. The first surface normal and the second surface normal can also run in the circumferential direction.

According to a further exemplary embodiment of the present invention the first surface normal and the second surface normal are at an angle to one another. The angle can be in particular between approximately ±0.5° and approximately ±40° or in particular between approximately ±1° and approximately ±20°. In other words the first surface is configured in such a manner that the first surface normal is at an angle for example between approximately 70° and approximately 110° to a first straight reference line running through the center point of the bearing ring of the first surface (in particular a straight line running in the radial direction). The second surface can be configured in such a manner that the second surface normal is at an angle between approximately 70° and approximately 110° to a second straight reference line running through the center point of the bearing ring and the second surface (in a radial direction). The first angle and the second angle are different from one another.

In other words the first surface and the second surface can be configured so that they are not parallel to one another. This is advantageous, particularly when die-casting or compression molding the bearing ring from plastic or metal. For example a spacer, for example a wedge, can be positioned between the non-parallel first and second surfaces, being able to be removed easily once the finished bearing ring has hardened. The bearing ring can thus be produced more easily and efficiently.

According to a further exemplary embodiment the first end has a stud, which extends from the first surface in the circumferential direction. The second end has a receiving channel into which the stud can be pushed. The stud and receiving channel form a contact surface in the axial direction of the bearing ring. The contact surface in the axial direction means that the bearing ring seals efficiently in the axial direction, as the gap is only present between the surfaces, the normals of which point in the circumferential direction. In contrast in the axial direction the stud and receiving channel overlap and form the contact surface so there is no through passage in the axial direction, providing a seal.

According to a further exemplary embodiment the second end has a further stud, which extends from the second surface in the circumferential direction. The first end has a further receiving channel, into which the further stud can be pushed. The further stud and the further receiving channel form a further contact surface in the axial direction of the bearing ring.

In other words one, two or more studs with receiving apertures between them are configured one behind the other in the axial direction on the first end and second end respectively. Engaging in the receiving apertures in each instance are the studs projecting from the other end in the circumferential direction. Fins, as it were, are formed by the studs at the first end and second end of the bearing ring, so that a labyrinth seal is configured between the first end and the second end. This provides an efficient seal in the axial direction even in the transition region between the first end and the second end.

According to a further exemplary embodiment at least one of the bearing ring or main body has a fastening aperture, the corresponding other bearing ring or main body having a projecting pin. The pin engages in the fastening aperture in such a manner that the bearing ring is fastened to the main body. The pin can have an indentation for example, so that it can pass through the fastening aperture and the pin locks on the edge region of the fastening aperture by means of the indentation. This allows a simply assembled click connection to be achieved.

According to a further exemplary embodiment the fastening aperture is a slit which is configured according to length in the circumferential direction. The length of the fastening aperture, which is configured in the circumferential direction, forms a region in which the pin can move in the circumferential direction. This reduces tensions at the bearing ring, which result from the spreading apart of the first end and second end of the bearing ring. When for example the first end spreads apart from the second end, the pin can be moved along the slit, thereby reducing possible tensions. The longitudinal profile of the slit can be curved and run so that it corresponds to the circumferential direction or linear and straight, thus only corresponding to the circumferential direction over a small region.

According to a further exemplary embodiment the fastening aperture has a slit, the length of which extends in the radial direction. When the distance between the first end and the second end changes, the pin can thus also move within the further slit in the radial direction so that there is a further degree of freedom to reduce tensions in the bearing ring due to a change in the distance between the first end and the second end The bearing ring and the main body can have a number of corresponding fastening apertures and pins that can be fastened therein. The fastening apertures can each have slits with a radial longitudinal extension extending in the circumferential direction. A combined slit can also be configured on the main body or on the bearing ring, having a longitudinal extension in the circumferential direction and/or having a longitudinal direction in the radial direction.

The drive can also have a further bearing ring which is arranged in the receiving aperture and fastened to the main body. The further bearing ring can also have a first end and a second end in the circumferential direction, it being possible for the first end and the second end to be spaced apart in the circumferential direction, so that there can be a gap between the first end and the second end. The bearing ring and the further bearing ring can be arranged one behind the other in the axial direction in the receiving aperture, it being possible for the hub to be fastened in such a manner that it is supported in a rotatable manner between the bearing ring and the further bearing ring.

It should be noted that the embodiments described here only represent a limited number of possible variants of the invention. It is thus possible to combine the features of individual embodiments with one another in a suitable manner so that the person skilled in the art will consider a plurality of different embodiments to be disclosed publicly with the variants set out specifically here. It should also be noted that embodiments of the invention have been described with reference to different subject matter of the invention. In particular some embodiments of the invention are described using apparatus claims and other embodiments of the invention are described using method claims. However the person skilled in the art, on reading the present application, will see immediately that, unless specifically stated otherwise, in addition to a combination of features belonging to one type of inventive subject matter any combination of features belonging to different types of inventive subject matter is also possible.

BRIEF DESCRIPTION OF THE DRAWINGS

Exemplary embodiments are described in more detail in the following with reference to the accompanying drawings for further explanation and a better understanding of the present invention.

DETAILED DESCRIPTION OF EXEMPLARY EMBODIMENTS

Identical or similar components in the figures are shown with identical reference characters. The diagrams in the figures are schematic.

Figure 1:
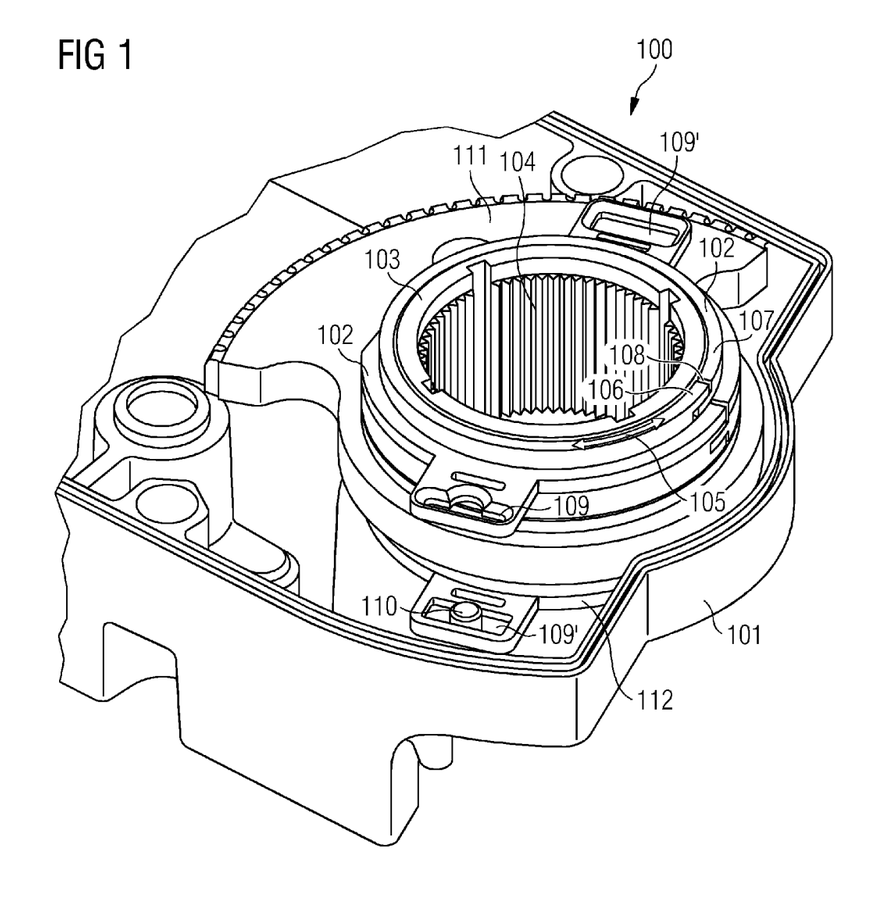
FIG. 1 shows an exemplary embodiment of a drive for adjusting a damper by means of two slotted bearing rings according to an exemplary embodiment of the present invention.

FIG. 1 shows a drive 100 for adjusting a damper of a building. The drive 100 has a main body 101 with a receiving aperture 104, a bearing ring 102 and a hub 103 for driving an output shaft of the damper. The bearing ring 102 is arranged in the receiving aperture 104 and fastened to the main body 101. The bearing ring 102 has a circumferential direction 105, the bearing ring 102 having a first end 106 and a second end 107 in the circumferential direction 105. The first end 106 and the second end 107 can be spaced apart in the circumferential direction 105, so that there can be a gap 108 between the first end 106 and the second end 107. The hub 103 is fastened to the bearing ring 102 in such a manner that the hub 103 is supported on the main body 101 in a rotatable manner relative to the bearing ring 102.

The hub 103 is coupled to a drive wheel 111. The drive wheel 111 and the hub 103 can be configured integrally and as a single piece or as a number of pieces. A drive motor, for example an electric servomotor (not shown), of the drive 100 engages for example by way of a tooth connection in the drive wheel 111. The servomotor drives the drive wheel 111 and therefore the hub 103, until the hub 103 takes up a desired position. A shaft of a damper can be fastened in a rotationally fixed manner in the hub 103 as the output shaft, so that an adjustment of the hub 103 brings about an adjustment of the damper to set the position of the damper of a building. The hub 103 is supported in a rotatable manner on the main body 101 by way of the bearing ring 102 and by way of a further bearing ring 112. The bearing rings 102, 112 are fastened to the main body 101 and form a sliding surface relative to the hub 103. The sliding surface can be provided between axial surfaces (the normals of which point in the axial direction) and/or between radial surfaces (the normals of which are aligned in the radial direction 202). To this end the bearing ring 102 and the further bearing ring 112 have good friction-type bearing properties, so that a relative rotational movement between the hub 103 and the respective bearing ring 102, 112 brings about little wear. The bearing ring 102 and the further bearing ring 112 can also be fastened in a rotationally fixed manner to the hub 103, it being possible to provide a relative movement (rotation) between the bearing rings 102, 112 and the main body 101.

When temperature fluctuations occur at the installation site of the drive 100, the respective bearing rings 102, 112 and also the hub 103 can expand and contract. These contraction and expansion movements can be compensated for by the bearing rings 102, 112 due to the gap between their first ends 106 and second ends 107. This reduces thermal tensions due to changing temperature conditions.

In the exemplary embodiment in FIG. 1 the bearing rings 102, 112 have tabs fastened to their outer surfaces, which have fastening apertures 109, 109'. The fastening apertures 109, 109' can be configured for example as a slit, the length of which extends in the circumferential direction. Arranged on the main body 101 are corresponding pins 110, 110', which can engage in the fastening apertures 109, 109'.

FIG. 1 only shows a lower half of the main body 101 for greater clarity. An upper half of the main body 101 can be fastened to the lower half of the main body 101, with corresponding pins 110, 110' being arranged on the upper half for example.

As the fastening apertures 109, 109' are configured as slits, the pins 110, 110' can move along said fastening apertures 109, 109' so that as they approach or move away from the first end 106 and second end 107 of the respective bearing rings 102, 112, a degree of freedom of movement is established so that tensions due to thermal expansion are reduced. The fastening of the bearing ring 102 by means of the fastening apertures 109, 109' and the pins 110, 110' also serves as securing for transportation purposes for example. The fastening apertures 109, 109' (or tabs) and the pins 110, 110' can be removed for operation of the drive 100, as the bearing ring 102 can be immobilized with the hub 103 or with the main body 101 due to its inherent tension for example.

Figure 2:
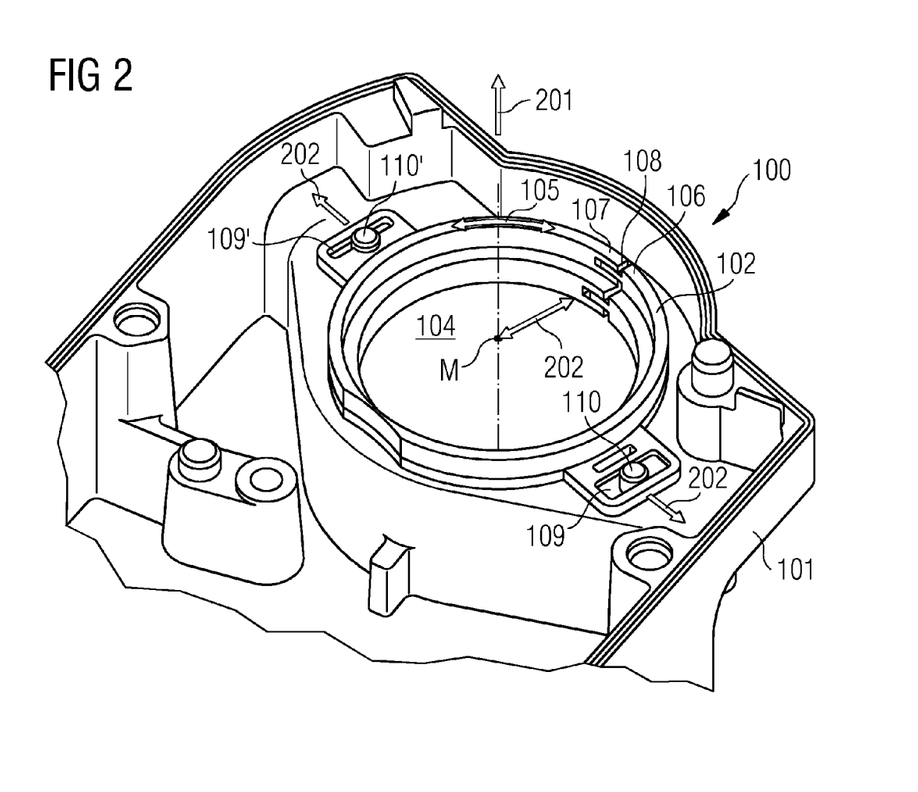
FIG. 2 shows a schematic diagram of a main body, to which the bearing ring is fastened according to an exemplary embodiment of the present invention.

In FIG. 1 a fastening aperture 109 also has a longitudinal extension in the radial direction 202 (see FIG. 2). Therefore a pin 110 can also have a further degree of freedom to reduce thermal tensions which result when the respective bearing ring 102, 112 contracts or expands. The longitudinal extension in the radial direction of the fastening aperture 109 can also serve to allow one of the pins 110 to latch in there and to ensure there is no degree of freedom of the pin 110 in the slit 109.

FIG. 2 shows the main body 101 and the bearing ring 102 without the hub 103 fastened therein to clarify the drive 100. The receiving aperture 104 has a center point M. The radial direction 202 is defined from this center point in the direction of the lateral surface of the bearing ring 109. The axial direction 201 is defined perpendicular to the circumferential direction 105 and the radial direction 202. The axial direction 201 can also be defined by the rotation axis of the hub 103.

FIG. 2 shows the fastening of the bearing ring 102 to the main body 101 more clearly. Configured on the outer lateral surface of the bearing ring 102 are tabs (fastening apertures 109, 109'), which have slits.

The fastening aperture 109, which in FIG. 2 is configured on the right side of the bearing ring 102, has a slit, the length of which extends approximately in the circumferential direction 105. A pin 110 of the main body can move freely along this length of the slot, so that when the bearing ring 102 expands the distance between the first end 106 and the second end 107 changes and therefore the gap 108 also changes. A further fastening aperture 109' is formed opposite this fastening aperture 109. The fastening aperture 109' has a diameter which corresponds to the external diameter of a pin 110'. The fastening aperture 109' also has a slit, the slit of the fastening aperture 109' only serving to save material and to allow the flexible and elastic configuration of the fastening aperture 109' to allow easier mounting of the fastening aperture 109 and the pin 110'.

Figure 3:
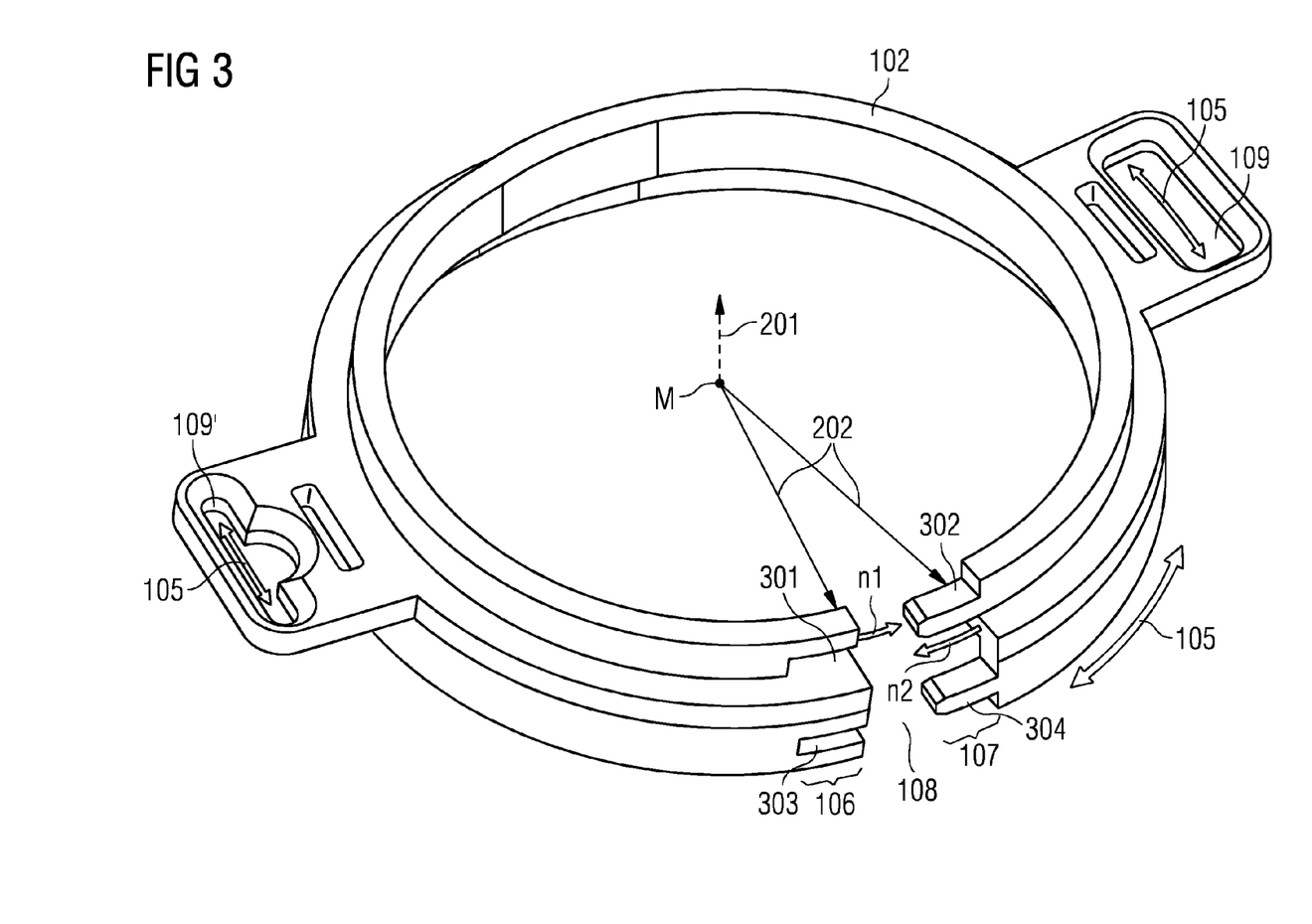
FIG. 3 shows a schematic diagram of a bearing ring in a spread apart state according to an exemplary embodiment of the present invention.
Figure 4:
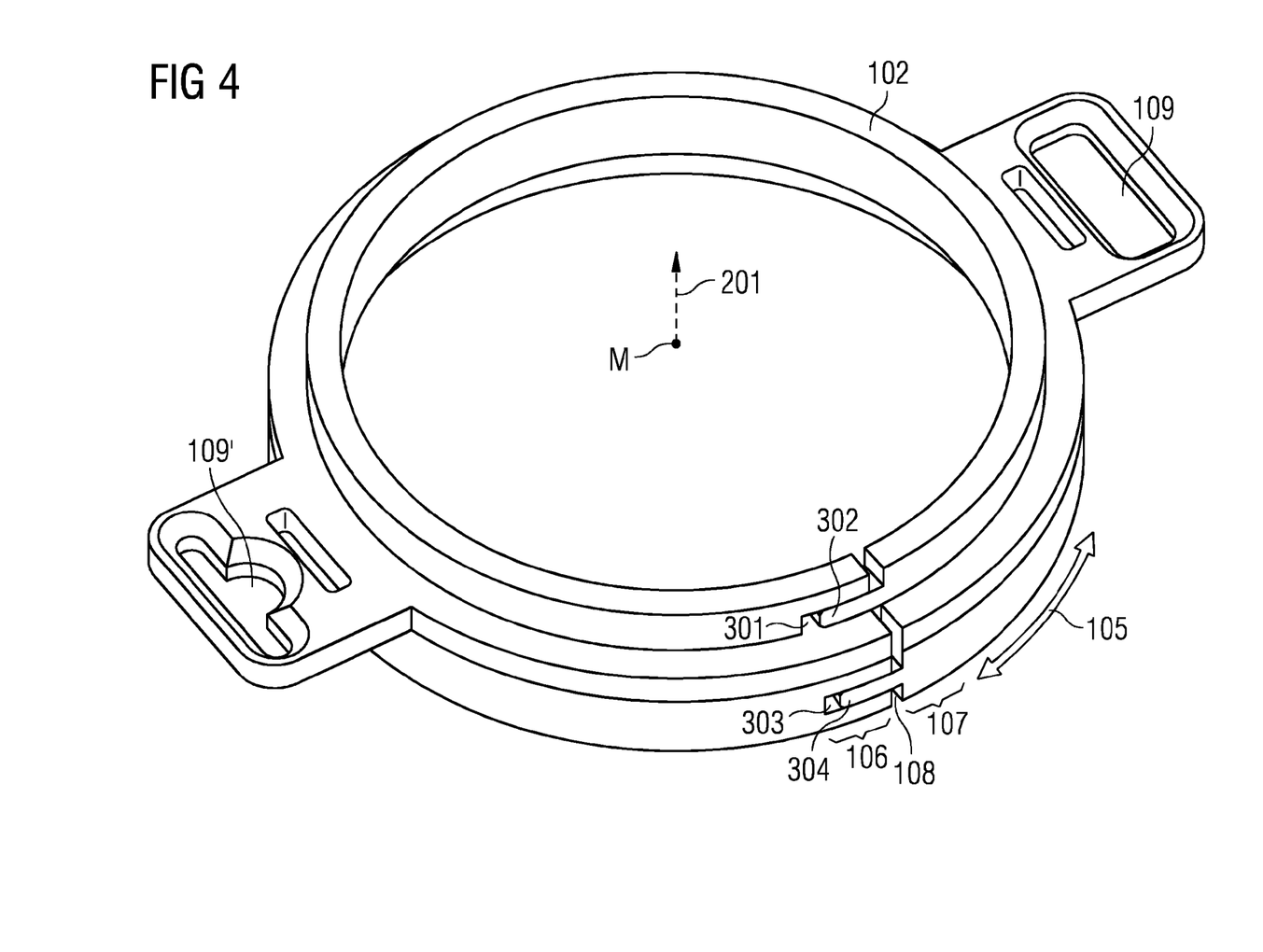
FIG. 4 shows a schematic diagram of a bearing ring in a compressed state according to an exemplary embodiment of the present invention.

FIG. 3 and FIG. 4 show an enlarged diagram of the bearing ring 102, the end regions 106, 107 of the bearing ring 102 being shown in particular.

In FIG. 3 the bearing ring 102 is shown in a spread apart position. The tabs with the fastening apertures 109, 109' are configured in respectively opposing positions on the outer lateral surface of the bearing ring 102. The gap 108 forms between the first end 106 and the second end 107.

The first end 106 in particular has a first surface with a first surface normal n1 and the second end 107 has a second surface with a second surface normal n2 opposite the first surface. The first surface and the second surface are spaced apart from one another by the slotted configuration of the bearing ring 102. When the bearing ring 102 is in a compressed position, the first surface and the second surface can touch due to the elastic properties of the bearing ring 102.

FIG. 3 shows the bearing ring 102 in particular with a labyrinth seal. The labyrinth seal is formed on the first end 106 and the second end 107. The first end 106 here has a receiving channel 301, into which a stud 302 configured on the second end 107 can be pushed. In the axial direction 201 a surface of the stud 302 and a surface of the receiving channel 301 form a contact surface, so that a sealing action can be generated in the axial direction 201. To enhance the sealing action, the respective ends 106, 107 can have further receiving channels 303 and further studs 304 engaging in said further receiving channels 303.

In FIG. 4 the bearing ring 102 is shown in a compressed state. The gap 108 between the first surface and the second surface has reduced significantly. The studs 302 and the further studs 304 are introduced into receiving channel 301 or the further receiving channel 303. In the axial direction the studs 302, 304 form contact surfaces with the corresponding surfaces of the receiving channel 301, 303, so that an efficient seal is provided.

Figure 5:
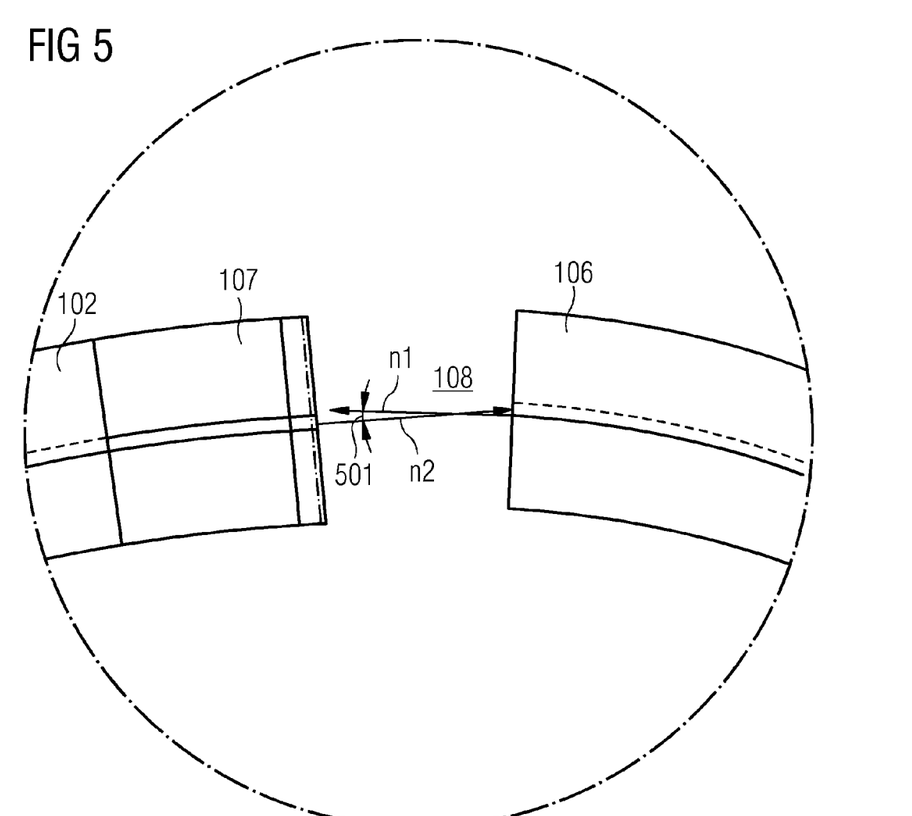
FIG. 5 shows an enlarged diagram of a first end and a second end of a bearing ring according to an exemplary embodiment of the present invention.

FIG. 5 shows the ends 106, 107 in greater detail. In an exemplary embodiment according to FIG. 5 the first surface normal n1 of the first surface and the second surface normal n2 of the second surface are at an angle 501 to one another. The angle 501 can be for example 1 to 20°. When the angle 501, which is in particular not equal to 0°, is present between the first surface and the second surface, the first surface can be separated from the second surface by means of a wedge in the production method. Because the first surfaces and second surfaces are not configured as parallel (or because of the angle 501 between the associated surface normals n1, n2), this wedge can easily be detached once the bearing ring 102 has hardened during its production, allowing a more efficient production method to be provided.

Figure 6:
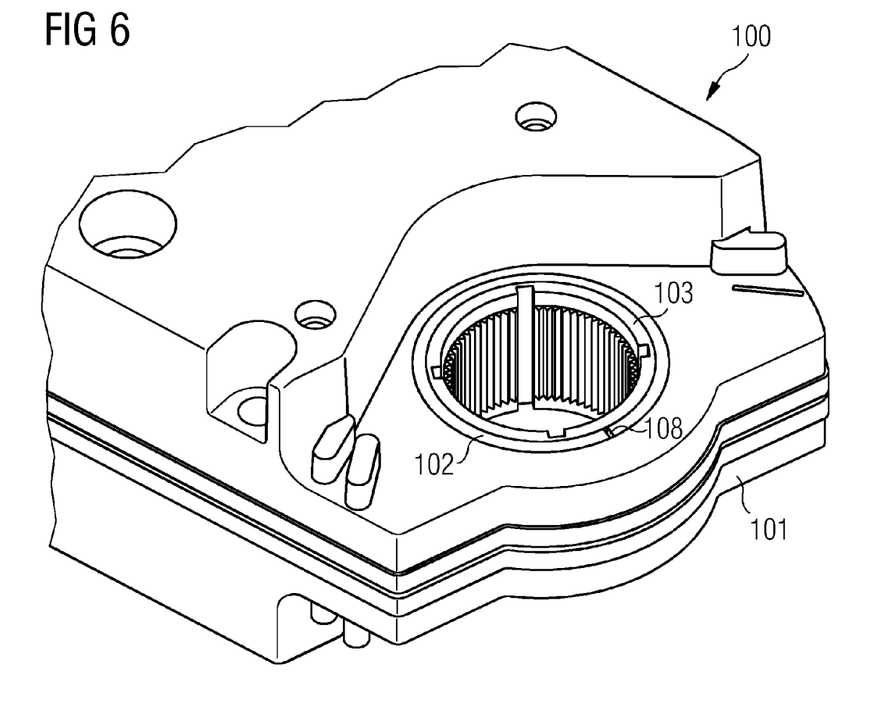
FIG. 6 shows a drive for adjusting a damper according to an exemplary embodiment of the invention, the drive being shown in a fully assembled state.

FIG. 6 shows the drive 100 in a mounted state. The main body 101 is formed from a housing upper shell and a housing lower shell, which together form the housing of the drive 100 at the same time. The hub 103 is supported in a rotatable manner in the slotted bearing ring 102. The bearing ring 102 is fastened to the main body 101. When temperature changes occur, the hub 103 and the respective bearing ring 102 can expand, as the bearing ring 102 in particular allows expansion and contraction due to the gap 108. This reduces thermal tensions.

At the same time the bearing ring 102 can have a labyrinth seal in the region of the gap 108, generating a sealing action in the axial direction 201. The bearing ring 102 can thus be embodied as slotted but can still prevent the ingress of liquids or gases from outside the drive 100 into the interior of the drive 100.

With the bearing ring 102 therefore it is possible to create a robust drive 100 in respect of thermal tensions, without reducing the seal against external influences.

It should also be noted that "comprising" does not exclude other elements or steps and "a" does not exclude a plurality. It should further be noted that features or steps described with reference to one of the above exemplary embodiments can also be used in combination with other features or steps of other exemplary embodiments described above. Reference characters in the claims should not be seen as restrictive.

LIST OF REFERENCE CHARACTERS

100 Drive
101 Main body
102 Bearing ring
103 Hub
104 Receiving aperture
105 Circumferential direction
106 First end
107 Second end
108 Gap
109, 109' Fastening aperture
110, 110' Pin
111 Drive wheel
112 Further bearing ring
201 Axial direction
202 Radial direction
301 Receiving channel
302 Stud
303 Further receiving channel
304 Further stud
501 Angle
n1 First surface normal
n2 Second surface normal
M Center point

The invention claimed is:
1. A drive for adjusting a damper of a building, the damper having a drive shaft, the drive comprising:
a main body formed with a receiving aperture for the drive shaft to project therethrough;
a bearing ring disposed in said receiving aperture and fastened to said main body, said bearing ring having a first end and a second end in a circumferential direction thereof, said first end and said second end being enabled to be spaced apart in the circumferential direction to thereby form a gap between said first end and said second end; and wherein said first end has a stud projecting from said a first surface in the circumferential direction, said second end is formed with a receiving channel for receiving said stud being pushed thereinto, said stud and said receiving channel forming a contact surface in an axial direction of said bearing ring;

wherein said stud and receiving channel are formed to enable said first end and said second end to come into contact with one another when said bearing ring is fully compressed and to completely disengage the contact surface in the axial direction when the bearing ring is spread apart;

a hub for driving the drive shaft of the damper, said hub having a central opening for receiving the drive shaft with the drive shaft projecting into said hub and centrally inside said bearing ring, said hub being mounted to said bearing ring and supported on said main body to be rotatable relative to said bearing ring; and a drive wheel coupled to said hub for rotating said hub together with the shaft relative to said bearing ring.

2. The drive according to claim 1, wherein said first end has said first surface with a first surface normal and said second end has a second surface with a second surface normal opposite said first surface.

3. The drive according to claim 2, wherein one or both of the following is true: said first surface normal and said second surface normal run anti-parallel to one another, and said first surface normal and said second surface normal extend in the circumferential direction.

4. The drive according to claim 2, wherein said first surface normal and said second surface normal enclose a given angle with each other.

5. The drive according to claim 4, wherein the given angle is an angle between 1 and 20 degrees.

6. The drive according to claim 1, wherein said second end has a further stud projecting from said second surface in the circumferential direction, said first end is formed with a further receiving channel for receiving said further stud being pushed thereinto, and said further stud and said further receiving channel forming a further contact surface in the axial direction of said bearing ring.

7. The drive according to claim 1, wherein at least one of said bearing ring or said main body is formed with a fastening aperture and the respectively other of said bearing ring or main body carries a projecting pin, said pin engaging in said fastening aperture to fasten said bearing ring to said main body.

8. The drive according to claim 7, wherein said fastening aperture is formed with a slit having a length dimension extending in the circumferential direction.

9. The drive according to claim 8, wherein said fastening aperture is formed with a further slit having a length dimension extending in a radial direction.

10. The drive according to claim 7, wherein said fastening aperture is formed with a slit having a length dimension extending in a radial direction.

11. A method for adjusting a damper of a building, the method comprising: providing a drive according to claim 1 and adjusting the damper by way of the drive according to claim 1.

12. A drive for adjusting a damper of a building, the damper having a drive shaft, the drive comprising:

a main body formed with a receiving aperture for the drive shaft to project therethrough;

a bearing ring disposed in said receiving aperture and fastened to said main body, said bearing ring having a first end and a second end in a circumferential direction thereof;

said first end and said second end being formed with one or more studs and one or more receiving channels complementary to said studs, forming a labyrinth seal enabling said first end and said second end to move relative to one another in the circumferential direction, said studs and said receiving channels forming a contact surface in an axial direction of said bearing ring enabling said first end and said second end to move relative to one another in the circumferential direction between a compressed position in which said first end and said second end are in contact with one another and spread position in which the bearing ring is spread apart forming an open gap between the first end and the second end;

a hub for driving the drive shaft of the damper, said hub having a central opening for receiving the drive shaft with the drive shaft projecting into said hub and centrally inside said bearing ring, said hub being supported on said bearing ring to be rotatable relative to said bearing ring; and a drive wheel coupled to said hub for rotating said hub together with the shaft relative to said bearing ring.

* * * * *